May 3, 1955     E. H. BUNN     2,707,608
STRAP SUPPORTED PIPE HANGER
Filed March 16, 1953
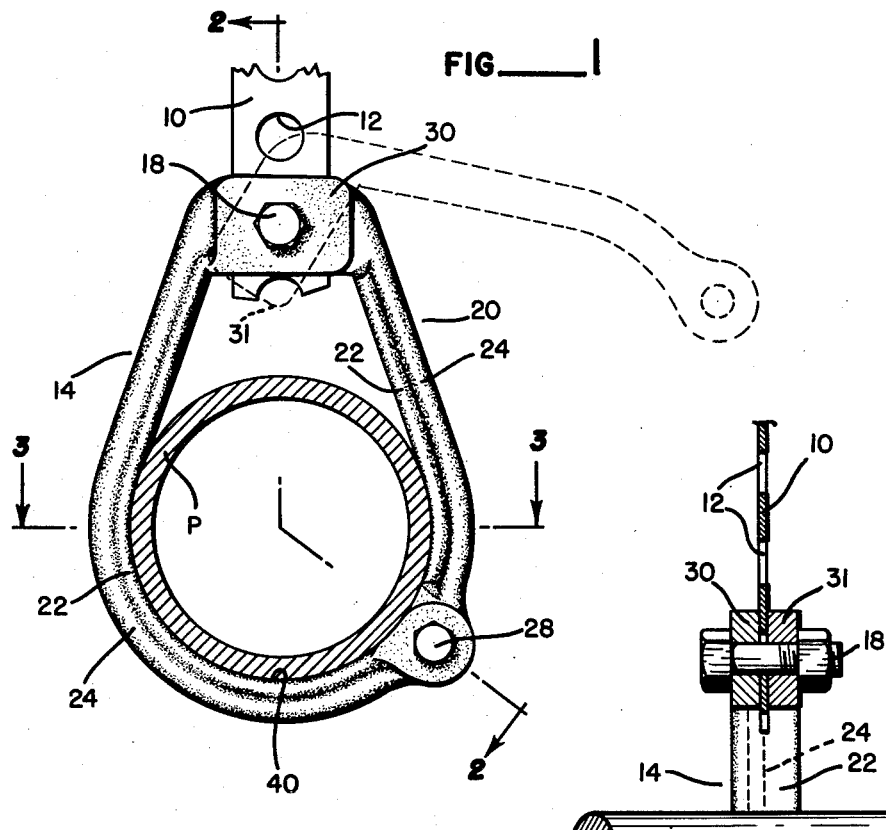
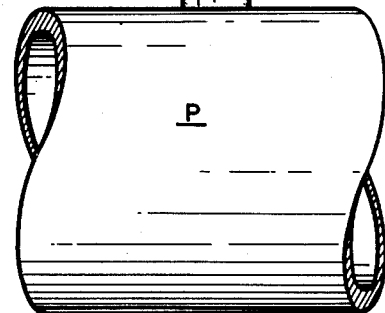
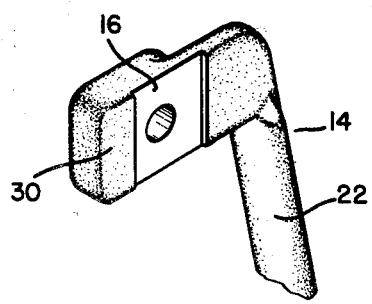
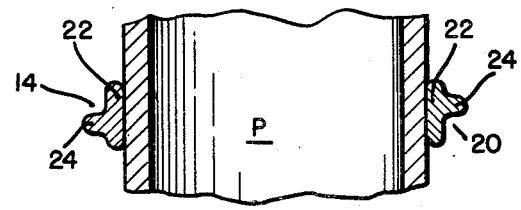
EARL H. BUNN
*INVENTOR.*
BY *Smith & Tuck*

United States Patent Office 2,707,608
Patented May 3, 1955

2,707,608

STRAP SUPPORTED PIPE HANGER

Earl H. Bunn, Seattle, Wash.

Application March 16, 1953, Serial No. 342,692

1 Claim. (Cl. 248—62)

This invention relates to the general class of pipe hangers and more particularly to a pipe hanger adapted to be supported from a perforated strap and in itself composed of two principal parts, one part, a hook-like supporting member is so arranged that it is definitely positioned by the hanging strap at its upper end and at its lower end the supporting member is provided with a rest portion which encircles the supported pipe sufficiently so that a pipe may be merely laid on the rest portion of a plurality of hangers with no danger of the same slipping off the support members during the installation of the pipe. The second portion of the pipe hanger proper completes the pear-shape outline and is bolted to the support member at its upper end and at the extreme end of the pipe-receiving portion.

In the past a wide range of pipe hangers has been provided, each of these having some especially desirable features. They have been characterized broadly into two classes, one where hinged-together cast or forged portions are used to encircle the pipe and the unit encircling the pipe is usually supported from the ceiling by rods or pipes which are threaded into the hanger proper and normally then also, at their upper ends, threaded to engage an appropriate flange or bracket member. Such a structure, once installed, is neat and very serviceable, but it requires a good deal of fitting for each of the hangers which involves an expensive workman's time. Further, these do not lend themselves to the hanging of pipe lines by a single individual.

The other extreme in pipe hangers is the perforated steel or iron strap which is secured to some overhead anchorage and then passed around the pipe and secured in its adjusted position by a bolt passing through two of the perforations. Such an arrangement is economical at first cost and can be installed with a minimum of labor. However, such a form of hanger normally requires two or three men to put up the various sections of pipe and this adds very materially to the overall cost of a pipe installation. In this present invention it is believed that the best capabilities of the two forms of hangers have been made use of and still provide equipment that is cheap in first cost, which is easily installed by one man and, which especially permits a single man to install long lengths of pipe unassisted. These are very important features considering the high cost of the time of skilled craftsmen.

The principal object of this invention is to provide a pipe hanger which employs a perforated supporting strap combined with cast or forged pipe encircling members so designed that a plurality of these hangers may be put in place and then a length of pipe may be laid in these hangers on the open side thereof and will be adequately supported during the period of installation.

A further object is to provide a pipe hanger having formed pipe-encircling members, one of which is adapted to, by itself, support a pipe temporarily in position because of the coaction between the supporting member and the performed metal strap hanger member.

A further object is to provide a high performance pipe hanger of so simplified a structure that it may be very economically manufactured.

Further objects, advantages and capabilities will be apparent from the description and disclosure in the drawings, or may be comprehended or are inherent in the device.

In the drawings:

Figure 1 is a cross sectional view through a pipe illustrating the manner of using the pipe hanger of this invention, the open position of one member is indicated in dashed lines;

Figure 2 is a vertical sectional view taken along the line 2—2 of Figure 1;

Figure 3 is a cross sectional view taken along the line 3—3 of Figure 1; and

Figure 4 is a fragmentary perspective view showing the strap engaging portion of the support or carrier member.

Referring more particularly to the disclosure in the drawings, the numeral 10 designates a strap-type hanger of the style made usually from steel strap stock and which is perforated at regular intervals by a plurality of holes 12. Strap 10 is secured to an overhead support usually by means compatible with the structure and material of the support member. In cases where it is practical to pass the strap around a timber, that is probably the most secure anchorage. However, it is more general to attach the same to a beam by driving a nail through two or more of the openings 12. The thickness and width of strap 10 is generally selected in keeping with the weight to be supported but in all cases it rarely is thick enough to give much resistance to bending on its short axis. However on the long axis of the section the width is sufficient so that considerable strength is provided and this strength is taken advantage of in the mounting of the supporting or carrier portions of the hanger 14.

It is to be noted that support member 14 is recessed at 16 so as to provide a snug engagement with the two edges of strap 10 so that when the securing bolt 18 is tightened, support member 14 is positioned quite securely against movement along the general plane of the hanger which would be transversely of the supported pipe P.

Adapted to coact with support portion 14 is the keeper portion 20 of the hanger proper. These members may be made in any convenient manner such as casting or forging, usually the most economical form is to make these members as malleable castings and to give them the general shape, in cross-section, illustrated in Figure 3 in which a relatively wide bearing portion 22 is provided and then a stiffening rib 24 extends the full length of the members on the side opposite from the pipe engaging side. Members 14 and 20 are bolted together by bolts 18 and 28 and when thus secured together form a pear-shaped member for encircling the pipe. In Figure 1 the pipe has been shown as the full size of the inner circle of the hanger. It should follow that several sizes of smaller pipes might be used in the same hanger and it is usually more economical to use the hanger for more than one size of pipe.

It will be noted in Figure 4 that the upper strap-engaging portion 30 of support member 14 has a very appreciable vertical extent. This is to permit it to have a very firm engagement with strap 10. It has been found desirable to also provide that the upper end of member 20 be similarly formed, as 31, so that it will have adequate frictional engagement with the strap although it is not recessed as is member 14.

The upper lugs as 30 and 31, of hanger members 14 and 20 respectively, and the lower bolt bosses 34 and 35, of these members respectively, which engage bolt 28, are all arranged by halving them so that the pipe-engaging web portions of members 14 and 20 will be diametrically opposed when in their final projected position. To achieve this with adequate strength in a simple casting, it will be noted in Figure 3 that the ribs 24 in the two members are in a staggered relationship. This characteristic is indicated by the dotted lines at 24 in Figure 2.

In using my improved pipe hanger which is designed for the convenience of a single workman so that he may handle the entire job of installing pipe line in an installation, the workman secures a plurality of hangers in place usually along one side of a wooden beam. Such an installation is normally made by driving one, or preferably a plurality of nails into the beam, each passing through a separate hole 12 of strap 10. When so arranged the various hangers usually will fall in a single vertical plane and it is only necessary for the workman to be concerned with having the pipe-supporting rest portions of carrier 14 as 40 each positioned in alignment so that each of the hangers will support the pipe snugly and carry its full share of the weight. When the hanger is in position bolt 28 is taken out so that the keeper member 20 may be revolved up to the dashed line position shown in Figure 1. In this position bolt 18 is tight enough so that strap 10 is gripped securely between pad 31 of member 20 and pad 30 of member 14, at the same time strap 10 is pressed firmly into recess 16. This insures that the carrier portion 14 is held in the same position it would be held in were keeper member 20 in its final supporting position. With a plurality of hangers installed the single workman can then raise a length of pipe up and, in effect, rest it on the plurality of hooks provided by the carrier portions 14 of the aligned hangers. When the pipe is in proper position, the single workman then may go to each of the hangers and by loosening bolt 18, swing keeper member 20 down so that bolt 28 may pass therethrough. Bolts 18 and 28 are then tightened and the installation is complete. It is desirable to point out that while a large number of pipe hangers have been developed in the past, it is not believed a pipe hanger has been available using the perforated strap as one element and preformed portions as the lower elements in such an arrangement that a single workman, without assistance, can put the hangers in place and then put a pipe in place within the hangers. This is believed to be a very worthwhile advancement in this field.

What I claim is:

A strap-supported pipe hanger, comprising: an upright hanger formed by a support member and a keeper member disposed in connected end-to-end relation forming an annular outline in the plane of said members, a first point of connection between the support and keeper members being at the top of the hanger and the second point of connection being at one side at the lower part of the hanger with said support member extending downward from the first point of connection and then starting upwards in a reverse bend to the second point of connection whereby a pipe may be positioned on the support member and be held against rolling off the same in the absence of the keeper member by the upwardly extending portion of the support member adjacent the second point of connection, means connecting the support and keeper members at said second point of connection permitting unfastening of the connection, said support and keeper members being lapped at the first point of connection and having a pair of aligned through openings and a bolt positioned therein forming a hinged connection, an elogated vertical strap rigid against bending on its major transverse axis, said strap having means in its uper portion for securing the same to an upper supporting surface and having a lower opening, said support member having a vertical groove facing said keeper member at the first point of connection of a size to closely fit the lower end of said strap which is positioned therein with the bolt extending through said lower opening and nut means on said upper bolt securing said strap in said groove whereby said hanger is secured against movement sideways in the plane of said strap when the upper end portion of said strap is secured in position, the face of said keeper member at said first point of connection facing said strap being flush permitting pivoting of said keeper member without interference.

References Cited in the file of this patent
UNITED STATES PATENTS

| | | |
|---|---|---|
| 552,986 | Carll | Jan. 14, 1896 |
| 791,504 | Rosenfeld | June 6, 1905 |
| 981,769 | Kinowski | Jan. 17, 1911 |
| 1,853,010 | Wray | Apr. 5, 1932 |